April 16, 1968  J. F. SMITH ET AL  3,378,670
METHOD OF CRATERLESS ELECTRON-BEAM WELDING
Filed March 23, 1964  3 Sheets-Sheet 1

WITNESSES
Theodore F. Wrobel
James T. Young

INVENTORS
James F. Smith
and Richard Miller
BY
Hymen Diamond
ATTORNEY

United States Patent Office 3,378,670
Patented Apr. 16, 1968

3,378,670
METHOD OF CRATERLESS ELECTRON BEAM WELDING
James F. Smith, Snowden Township, and Richard Miller, Circleville, Pa., assignors to Westinghouse Electric Corporation, Pittsburgh, Pa., a corporation of Pennsylvania
Filed Mar. 23, 1964, Ser. No. 353,752
5 Claims. (Cl. 219—121)

ABSTRACT OF THE DISCLOSURE

Method of craterless welding of work W (FIG. 1) with a focused electron beam E. The crater (K, FIG. 5) tends to form at the end of a welding seam and is suppressed (FIG. 6) by reducing the current of the beam E by increasing the negative bias on electrode 15 (FIG. 1) at the instant when the crater would tend to start to form. The reduction of the current not only reduces the electron energy flowing into the work W but also increases the voltage across the beam E (FIG. 3), increasing the speed of the now lower number of electrons in the beam, and defocusing the beam E. The defocusing aids the elimination of the crater because it reduces the penetration of the beam into the work. In addition the amount of defocusing varies with the magnitude of the beam welding current, being small for small current so that a smooth weld termination is produced regardless of the magnitude of welding currents.

---

This invention relates to the art of welding and has particular relationship to electron-beam welding. In joining materials by electron-beam welding in accordance with the teachings of the prior art, it has been found that where a weld of appreciable length as distinct from a spot weld is produced a crater occurs at the end of the weld. The crater is esentially a region of the welded joint, whose surface is depressed with respect to the remainder of the weld or with respect to the work surface. Where the electron-beam welding current is high the crater may be deep leaving the material at the crater very thin. Where electron-beam welding current is relatively low the crater may be shallow. It is an object of this invention to eliminate or substantially reduce the crater at the end of an electron-beam weld.

It is another object of this invention to provide a method of welding in the practice of which craterless welds shall be produced.

Electron-beam welding apparatus used in the practice of this invention includes an electron-emissive cathode and a cooperative anode between which a potential is impressed to produce an electron beam. This invention is applicable to apparatus in which the power in the beam is highly concentrated so that predominantly the welding is produced by transfer of heat from electrons rather than by heat conduction. The high power concentration is most effectively achieved with a high potential of the order of 100 or 150 kilovolts impressed between the anode and the cathode to produce the beam of electrons and this invention is peculiarly advantageous in such high voltage apparatus. But in accordance with its broader aspects this invention is applicable to high current lower voltage apparatus. In such apparatus the voltage may be as low as twelve kilovolts and the current as high as ½ ampere. The electron beam however produced is aligned and focused and projected onto the work in welding relationship with the work.

The apparatus used in the practice of this invention also includes a biasing electrode on which a biasing potential is impressed to control the current of the beam. The welding current conducted by the beam in the usual practice of this invention varies from a half milliampere to 20 milliamperes depending on the thickness of the material to be welded. The voltage drop across the electron beam varies generally inversely with the current and is higher at the lower current but is in any event of the order of one hundred kilovolts. At the power concentration under consideration the beam is penetrating and the welding is produced predominantly by the heat from the charges in the beam rather than by thermal conduction from one part of the work being welded to another. In welding in accordance with the teachings of the prior art, a crater is produced at the end of the weld. At ½ milliampere this crater is shallow; at 20 milliamperes, it is deep and the work may be perforated.

In accordance with this invention in its specific aspects a method of electron-beam welding is provided in the practice of which the electron-beam current is substantially reduced at the end of the weld. This reduction in the electron-beam current not only reduces the energy in the beam and thus the penetration of the beam into the work but also materially increases the potential or voltage drop across the beam. The increase in drop arises because the power supply for producing the beam is of substantial impedance and the decrease in the drop in the power supply resulting from the decreased current in the beam increases the voltage across the beam. The lower-current beam supplied at a higher voltage is relatively stiff and is affected differently by the beam focusing mechanisms, which may be electromagnetic coils or electrostatic plates. The beam is thus defocused and becomes more diffuse on the surface of the work. It has been found in actual practice that as a result of the combined effect of the decreased penetration of the beam and its increased diffuseness, the crater is substantially eliminated. This effect of the decreased penetration and increased diffuseness is more marked where the electron-beam current is higher, for example 20 milliamperes, than where it is low, for example ½ milliampere, but at ½ milliampere the crater is shallow and the effect need not be as marked as at 20 milliamperes where the crater is deep.

The method according to this invention is practiced with apparatus which may be operated manually but which includes automatic features for situations in which a number of like welds are to be produced. This apparatus includes bias varying means, which specifically includes a variable transformer for varying the bias potential. By moving the adjustable arm of the transformers the bias is varied gradually. During normal welding, the transformer is at a first setting at which the current of the beam is at welding magnitude. Near the end of the weld the adjustable arm of the transformer is gradually moved to a second setting at which the beam current is very low or substantially zero. By thus tapering off the current, the penetration of the beam is reduced and defocussed so that the crater is eliminated. The arm of the variable transformer may be varied by hand but in accordance with a further aspect of this invention apparatus is provided for automatically effecting changes in setting of the variable transformer from the first to the second setting and for resetting the transformer at the first setting. With such aparatus the operator can produce a large number of crater-free welds without taking time for resetting the bias following the completion of each weld.

The novel features considered characteristic of this invention are disclosed above. For a better understanding of this invention, both as to its organization and as to its method of operation together with additional objects and advantages thereof, reference is made to the following description taken in connection with the accompanying drawings in which.

Figure 1:
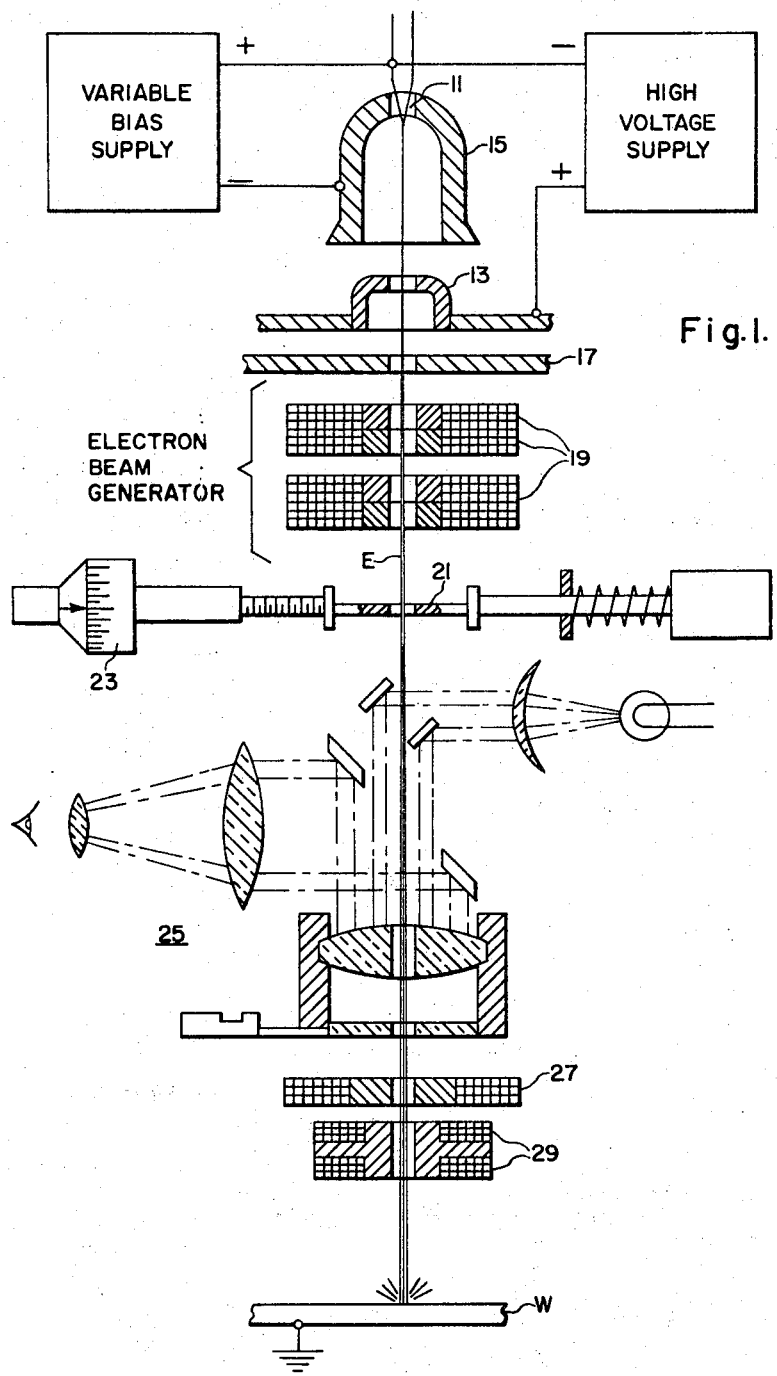
FIGURE 1 is a diagrammatic view showing apparatus for practicing this invention.

The apparatus shown in FIGURE 1 includes an electron-beam generator, a power supply and a variable bias supply. The power supply is connected to energize the electron-beam generator and to produce an electron-beam E. The bias supply is variable and is connected to the beam to vary its intensity.

The electron-beam generator produces beam E of electrons in a highly evacuated container (not shown for clarity). This beam E is projected in welding relationship with the work W. Typically the work may be within the evacuated container for example as disclosed in Burton et al. Patent 3,093,726. The work W may also be outside of the evacuated chamber. In this case, the electron-beam E is concentrated through apertures on the work W which is disposed a very short distance from the chamber.

The electron-beam generator includes a heated cathode 11 which serves as a source of electrons. The cathode 11 may be of the direct type as shown or it may be of the indirect type for example, a rod heated by electron bombardment from a coil from the end of which electrons are emitted. The generator also includes an anode 13 cooperative with the cathode 11 to draw electrons from the cathode to produce the electron beam E. The power supply is connected between the anode 13 and the cathode 11 impressing a voltage therebetween to produce the beam. Typically the cathode 11 is maintained at a high negative potential and the anode 13 is grounded. The supply may impress a voltage of the order of 100 to 150 kilovolts between the anode and the cathode 11.

The generator also includes a control electrode 15 which controls the beam current. The variable bias supply is connected between the control electrode 15 and the cathode 11 with its electrically negative pole connected to the control electrode 15 and the electrically positive pole connected to the cathode 11. The higher the bias the smaller the current in beam E.

The generator also includes a diaphragm 17 of a refractory material such as tungsten or the like which has an opening through which the beam E passes and which collimates the beam. There are also electromagnetic coils 19 which align the beam; typically these coils are supplied with direct current voltage of the order of 80 to 100 volts for alignment purposes. The generator also includes an additional diaphragm 21 for positioning or directing the beam E. The opening in this diaphragm may be set by micrometers 23 which extend outside of the container (not shown) in which the beam E is produced.

There is also an optical system 25 for observing the welding operation. There is in addition, a magnetic lens 27 for focussing the beam E on the work W. This lens 27 is an electromagnet which typically may be supplied with direct-current voltage which may vary from 100 volts to 1250 volts. The setting of the focusing magnetic lens 27 depends upon the character of the work W. Typically the beam may be focused on the surface of the work or just below the surface.

Further the generator includes beam deflection, electromagnetic coils 29 on which alternating current may be impressed to deflect the beam backwardly and forwardly in producing a weld of a predetermined width. For this purpose a voltage typically between 0 and 34 volts alternating current may be impressed on the deflection coils. Direct current may be impressed on these deflection coils 29 for the purpose of guiding the beam E along the seam to be welded in the work W.

The above described electron-beam generator is typical of generators which may be used in the practice of this invention. Such generators may have various forms materially different from that shown without departing from this invention.

The power supply is of the direct-current type capable of supplying a 100 to 180 kilovolts. This supply is of the high impedance type absorbing a substantial portion of the open circuit voltage during operation.

Figure 2:
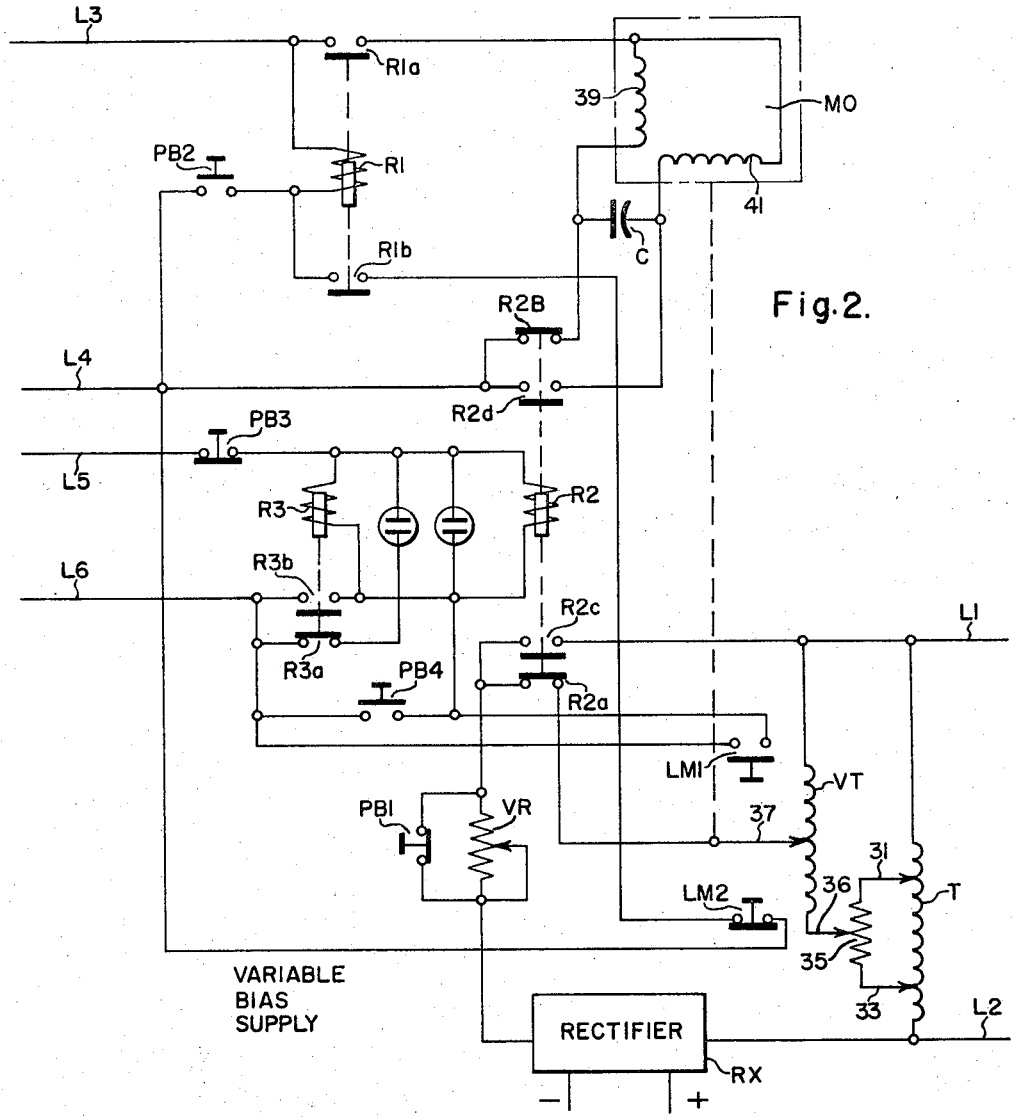
FIGURE 2 is a schematic showing beam-current varying apparatus which operates automatically to vary the beam-current near the end of each weld and is particularly suitable for use in situations in which a number of like welds are made.

The variable bias supply is of the direct current type and may be derived from the bases L1, L2 of a commercial supply through transformers T and VT and a rectifier RX (FIGURE 2). Typically the bias supply voltage may vary from zero to −1000 volts. The negative pole of the bias supply is connected to the control electrode 15, and the positive pole to the cathode 11. By varying the bias supply potential the beam-current may be varied. In the practice of this invention the bias voltage is set for welding current during the normal welding operation and is gradually increased near the end of a weld to reduce the welding current to zero to suppress crater formation.

The relationship between the beam-current, the voltage-drop across the beam E and the voltage-drop across the power supply is shown in the following Table I.

| Beam Current (ma.) | Voltage Drop Across Beam in Kilovolts | | | | | Average Voltage Drop Across Supply |
|---|---|---|---|---|---|---|
| | 110 | 120 | 130 | 140 | 150 | |
| | Voltage Drop Across Supply in Kilovolts | | | | | |
| 1. | 4 | | | | | 4 |
| 1.5 | | | | | | |
| 2.0 | 7 | | 11 | | | 9 |
| 2.5 | 10 | 12 | 13 | 8 | 15 | 12 |
| 3.0 | 13 | 15 | 15 | 10 | 16 | 13— |
| 3.5 | 14 | 15 | 15 | 14 | 18 | 14 |
| 4.0 | 15 | 17 | 18 | 15 | 20 | 17 |
| 4.5 | 17 | 17 | 20 | 18 | 22 | 19 |
| 5.0 | 17 | 20 | 22 | 20 | 22 | 20 |
| 5.5 | | | | | | |
| 6.0 | | | 23 | | | 23 |
| 6.5 | | | | | | |
| 7.0 | | | | | | |
| 7.5 | | | | | | |
| 8.0 | | | 24 | | | 24 |
| 8.5 | | | | | | |
| 9.0 | | | | | | |
| 9.5 | | | | | | |
| 10.0 | | | 28 | | | 28 |
| 10.5 | | | | | | |

Figure 3:
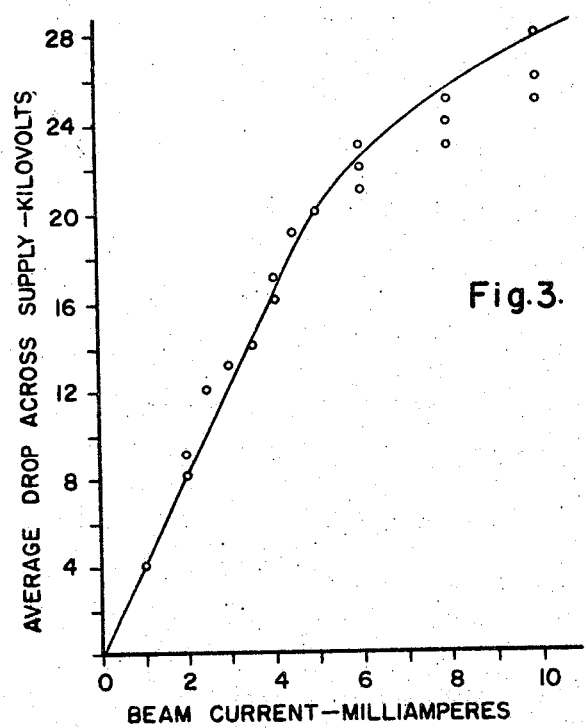
FIGURE 3 is a graph showing characteristic of apparatus according to this invention.

In the left-hand column the beam-current in milliamperes is present. The headings "110" to "150" above the other five columns are the beam voltages at which the various currents were produced. The numbers in the columns headed "110" to "150" are the voltage drops in kilovolts in the supply at the beam currents and voltages in the first column and top row. Thus at 3.5 milliamperes current and 110 volts beam voltage the drop across the supply is 14 kilovolts. The last column presents the average drop in the supply for each beam-current. The average drop across the supply is plotted as a function of the beam current in FIGURE 3. The plot shows an impedance of about 4 megohmns up to about 5 milliamperes and lower impedance at higher current.

A variable bias supply which is set automatically is shown in FIGURE 2. In this case the transformer T is an auto-transformer connected between the busses L1 and L2 which may supply 220 volts single phase alternating current. The auto-transformer T has adjustable taps 31 and 33 across which a variable resistor 35 is connected. A variable transformer VT is supplied from the adjustable tap 36 of the resistor 35. The adjustable tap 37 of the variable transformer VT operates between a pair of limit switches LM1 and LM2; one, LM1, set at the maximum bias voltage setting (minimum or zero current) and the other, LM2, set at the minimum bias voltage setting welding current. The adjustable tap 37 of the variable transformer is moved by a motor MO which may be typically a Bodine gear motor. The motor MO is reversible and is capable of driving the tap 37 from the minimum voltage setting at which the minimum limit switch LM2 is opened to the maximum voltage setting at which the maximum voltage limit switch LM1 is closed.

The variable bias supply includes the rectifier RX which is supplied from the variable transformer VT and supplies the direct current bias to the electrode 15. A bus L2 is connected to one terminal of the rectifier RX. The adjustable tap 37 of the variable transformer VT is connected to the rectifier through the back contact R2a of the relay R2 and through a normally closed pushbutton PB1. The pushbutton PB1 is shunted by a variable resistor VR. During the setting of the apparatus the pushbutton PB1 is opened and the resistor is adjusted to locate the beam. The relay R2 has in addition the back contact R2a, back contact R2b and front contacts R2c and R2d.

The motor MO has two stator windings 39 and 41 and is energized from the buses L3 and L4 of 110 volt commercial alternating-current single-phase supply. One winding 39 of the motor MO is adapted to be connected between the buses L3 and L4 through the front contact R1a of a relay R1, and the back contact R2b to the other terminal L4 of the supply. The other winding 41 is connected in a circuit extending from L3, through the front contact R1a, to the winding, a capacitor C, and through R2b to L4. The relay R1 has an additional front contact R1b. The coil or relay R1 may be connected between L3 and L4 by the closing of the normally open pushbutton PB2 which is closed to start the beam current tapering operation to eliminate a crater. On the closing of PB2 the relay R1 is actuated closing R1b which locks the coil of R1 in circuit L3, R1, R1b, LM2, L4.

The variable bias supply also includes a relay R3 which has back contact R3a and front contact R3b. The coil of the relay R3 is adapted to be energized from conductors L5 and L6 of a single-phase 110 volt alternating-current supply. This circuit extends from L5, through a normally closed pushbutton switch PB3 (which is opened to turn the beam on) a normally-open pushbutton switch PB4 (which is closed to turn the beam off), to the bus L6. When R3 is deenergized, an indicating lamp is energized through a circuit which extends from the line L5 through switch PB3, the lamp and contacts R3a to the bus L6. When R3 is energized the following circuit is closed to energize the coil of relay R2, from bus L5 through switch PB3, the coil of relay R2, and the switch R3b to the bus L6. R2 and R3 are locked in through R3b.

In the use of the apparatus the beam E is energized from the power supply. The taps 31, 33, 35 and 37 on the auto-transformer T and the variable resistor VR are so set that with the adjustable tap 37 of the variable transformer VT in the starting position and limit switch LM2 open, the beam E has the voltage desired for welding. The beam E is then projected on a tungsten block (not shown) which is in the position of the work W and is aligned by setting the voltage on the beam alignment coils 19 and focused by setting the voltage on the magnetic lens 27. The tungsten block is then replaced by the work W and the welding on the work W is carried out.

Near the end of the weld the operator closes pushbutton PB2, the motor MO is energized and drives the tap on the variable transformer VT in a direction such as to reduce the beam current. When the tap moves away from the welding beam-current setting, the switch LM2 is closed and the relay R1 is locked in through R1b and LM2. The motor MO is locked in the energized condition and continues to advance the variable tap 37.

Figure 4:
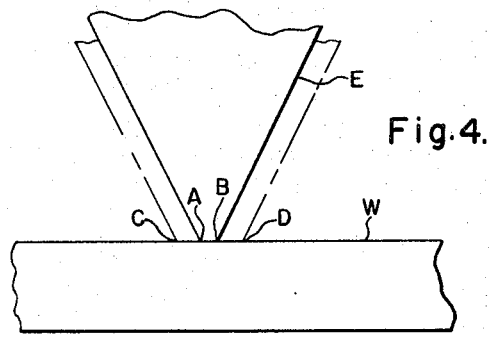
FIGURE 4 is a fragmental diagrammatic view illustrating the operation of this invention.

As the beam current decreases, the voltage drop across the power supply decreases substantially and the voltage-drop across the beam E increases. The speed of the electrons in the beam E increases and is less subject to influence by the magnetic lens 27 and is defocussed. This is illustrated in FIGURE 4 in which the original beam E is shown enlarged in full lines and the beam produced at substantially decreased current in broken lines. The original beam impinges on the work W over a circular area having a diameter AB and the defocused beam over an area having a diameter CD. The region of engagement of the beam and the surface of the work is thus more diffuse than during normal welding. In addition, the energy in the beam is reduced so that the electrons heat the work in this vicinity less. By the cooperation of these two effects the crater is effectively eliminated.

The motor MO continues to drive the adjustable tap 37 of the variable transformer VT until the tap engages limit switch LM1 closing this switch. At the setting of the tap 37 at the point of engagement of the tap and LM1 the beam current is biased substantially to zero.

With switch LM1 closed, relay R3 is actuated opening R3a and closing R3b. Relay 2 is actuated through R3b and relays R2 and R3 are locked in through R3b. On actuation of relay R2, R2c and R2d close. The bias supply is set at maximum voltage by R2c and the beam remains turned off. At R2d the motor MO is reversed, starting the resetting of the adjustable tap of the variable transformer. At this point LM1 opens but the relays R2 and R3 remain locked in through R3b. Relay R1 remains locked in through LM2 and R1b. The movement of the adjustable tap 37 then continues until the tap again reaches the welding position at which LM2 is opened deenergizing relay R1 and stopping the motor MO.

The operator now positions the work for a second welding operation. For this purpose PB1, which reduces the voltage supplied to the rectifier and thereby allows a low beam current to flow, is opened and a spot is focused on the work to facilitate locating the beam. He then opens pushbutton PB3 resetting relays R2 and R3 and starting a new operation. If the welding is of the same material and of the same type as during the first weld the mere opening of button PB3 resets the apparatus to start the second operation without more. The second weld may be produced in the same way as the first one.

The apparatus shown in FIGURE 2 is used in situations in which welds are produced repeatedly. In situations where single welds are produced or the automatic operation is for other reasons undesired the automatic features may be disconnected and the variable transformer VT may be varied by hand. Hand operation is particularly desirable where it is found that the uniform movement of the adjustable tap produced by the motor MO is not suitable.

Figure 5:
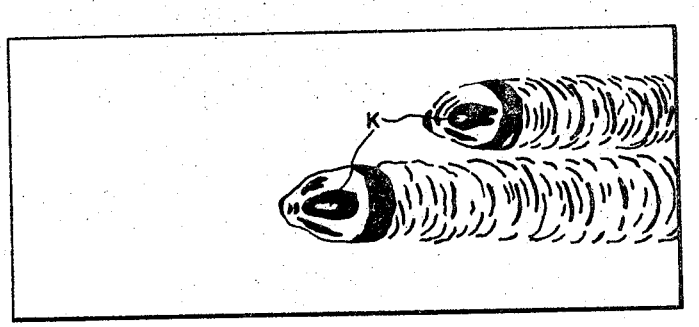
FIGURE 5 is a copy of a photograph of a weld made in accordance with the teachings of the prior art.
Figure 6:
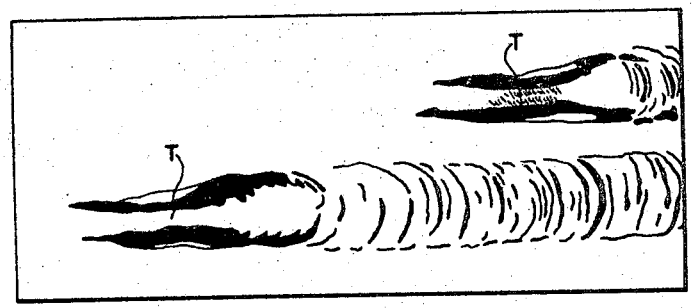
FIGURE 6 is a copy of a photograph of a weld made in the practice of this invention.

The apparatus has in practice proved highly satisfactory. FIGURE 5 shows two welds produced in accordance with the teachings of the prior art. It is seen that there is a deep crater K at the end of each weld. FIGURE 6 shows corresponding welds produced in the practice of the invention. It is seen that the end T of the weld is tapered and craters are entirely absent.

While preferred embodiments of this invention have been disclosed therein, many modifications thereof are feasible. For example this invention in its broader aspects is applicable to high power electron-beam welders in which the voltage may be as low as 12 kilovolts and the current very high, typically several hundred milliamperes to ½ ampere. This invention then is not to be restricted except insofar as is necessitated by the spirit of the prior art.

We claim as our invention:

1. The method of welding work with an electron-beam which comprises setting said beam at a magnitude such as to weld said work, focusing said beam, and projecting the so focused beam on said work in welding relationship with said work to weld said work, the said method being characterized by that the welding of said work is terminated without the formation of a crater in said work, by concurrently reducing the current of said beam and increasing the voltage of said beam near the end of the welding to reduce the penetration into the work of said beam and simultaneously to defocus said beam.

2. The method of claim 1 characterized by that the extent to which the beam is defocused varies with the beam welding current being higher for high welding currents and lower for low welding currents.

3. The method of welding work with an electron-beam which comprises setting said beam at a magnitude such as to weld said work, focusing said beam and projecting the so focused beam on said work in welding relationship with said work to weld said work, the said method being characterized by that the welding of said work is terminated without the formation of a crater in said work, by concurrently gradually reducing the current of said beam and correspondingly gradually substantially increasing the voltage of said beam near the end of the welding to reduce the penetration into the work of said beam and simultaneously to defocus said beam.

4. The method of welding work with apparatus including a source of electrons and a cooperative electrode, a high-impedance potential supply connected to said source and said electrode for producing an electron-beam, biasing means connected to said source for controlling the current in said beam, and focusing means for focusing said beam, comprising the steps of subjecting said work to the focused beam, and of thereafter actuating said biasing means to gradually reduce the current of said beam from the magnitude at which said beam is focused to a magnitude at which said beam is substantially defocused.

5. The method of making an electron-beam weld comprising the steps of directing a beam of electrons against a work, said beam being of sufficient density to weld the same, of focusing said beam of electrons near the work, of moving the beam relative to the work for a distance which is substantially the length of the desired weld, of thereafter concurrently decreasing the beam current and defocusing the beam to increase the area of the beam which impinges on the work and of thereafter discontinuing said beam, whereby a craterless weld of said work is produced.

References Cited

UNITED STATES PATENTS

| | | | |
|---|---|---|---|
| 3,033,974 | 5/1962 | Schleich et al. | |
| 3,291,959 | 12/1966 | Schleich et al. | |
| 2,152,785 | 4/1939 | Blankenbuehler | 219—135 |
| 3,165,619 | 1/1965 | Cohen | 219—121 |
| 3,258,576 | 6/1966 | Schleich et al. | 219—121 |

OTHER REFERENCES

"Welding, Drilling and Machining by Electron-Beam Bombardment," American Machinist, 1959, page 3.

RICHARD M. WOOD, *Primary Examiner.*

JOSEPH V. TRUHE, *Examiner.*

W. D. BROOKS, *Assistant Examiner.*